W. TETZLOFF.
ROAD GRADING AND DITCHING PLOW.
APPLICATION FILED MAY 25, 1916.
1,213,434.
Patented Jan. 23, 1917.
4 SHEETS—SHEET 1.
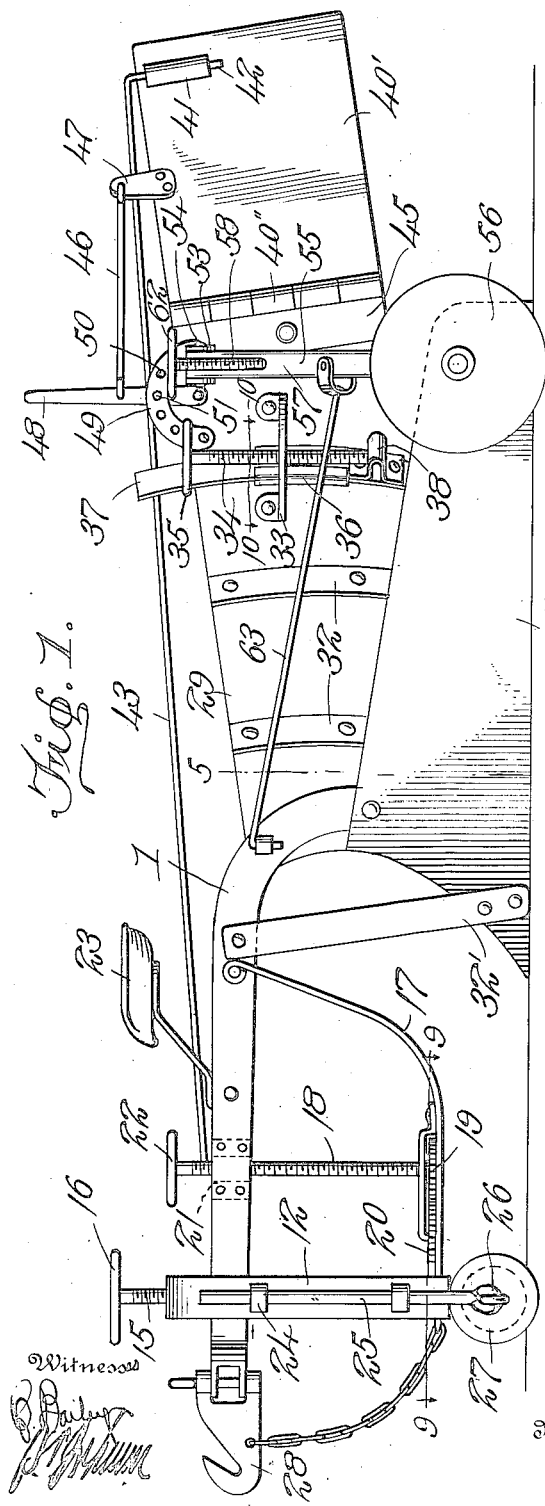
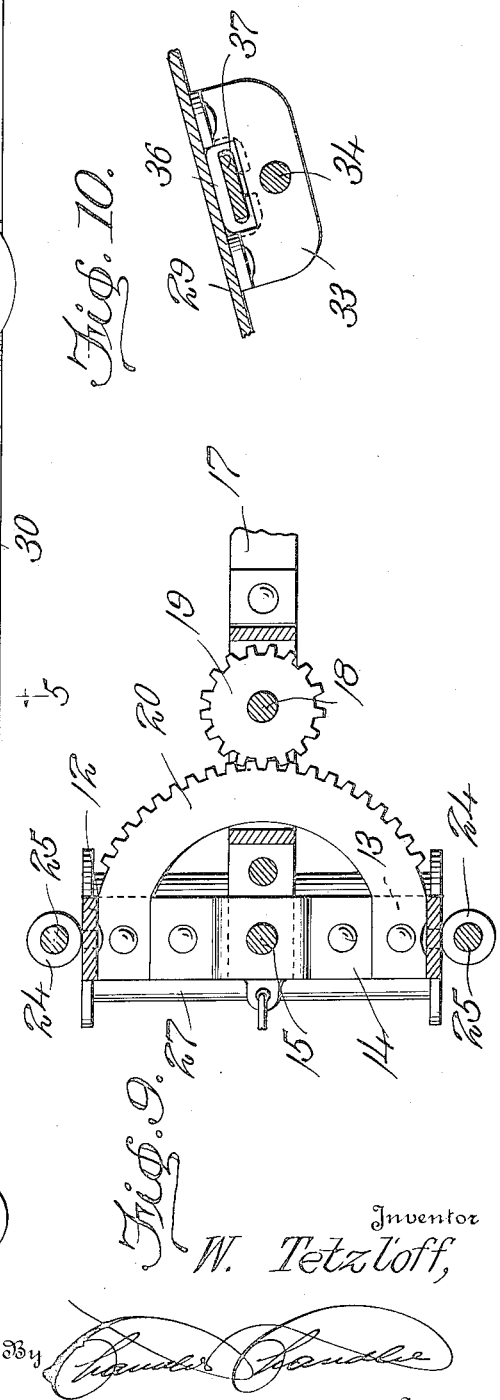
Inventor
W. Tetzloff,

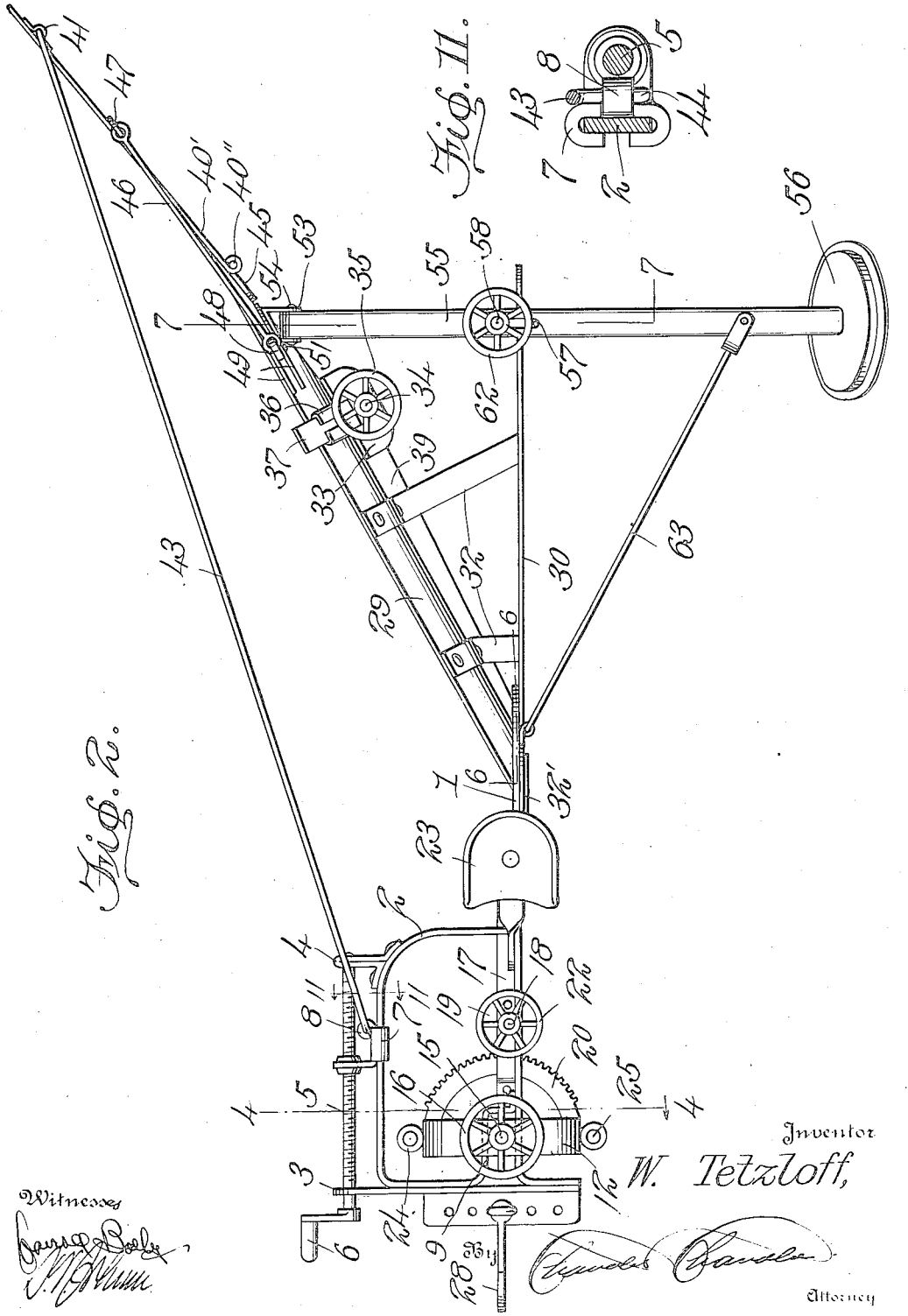

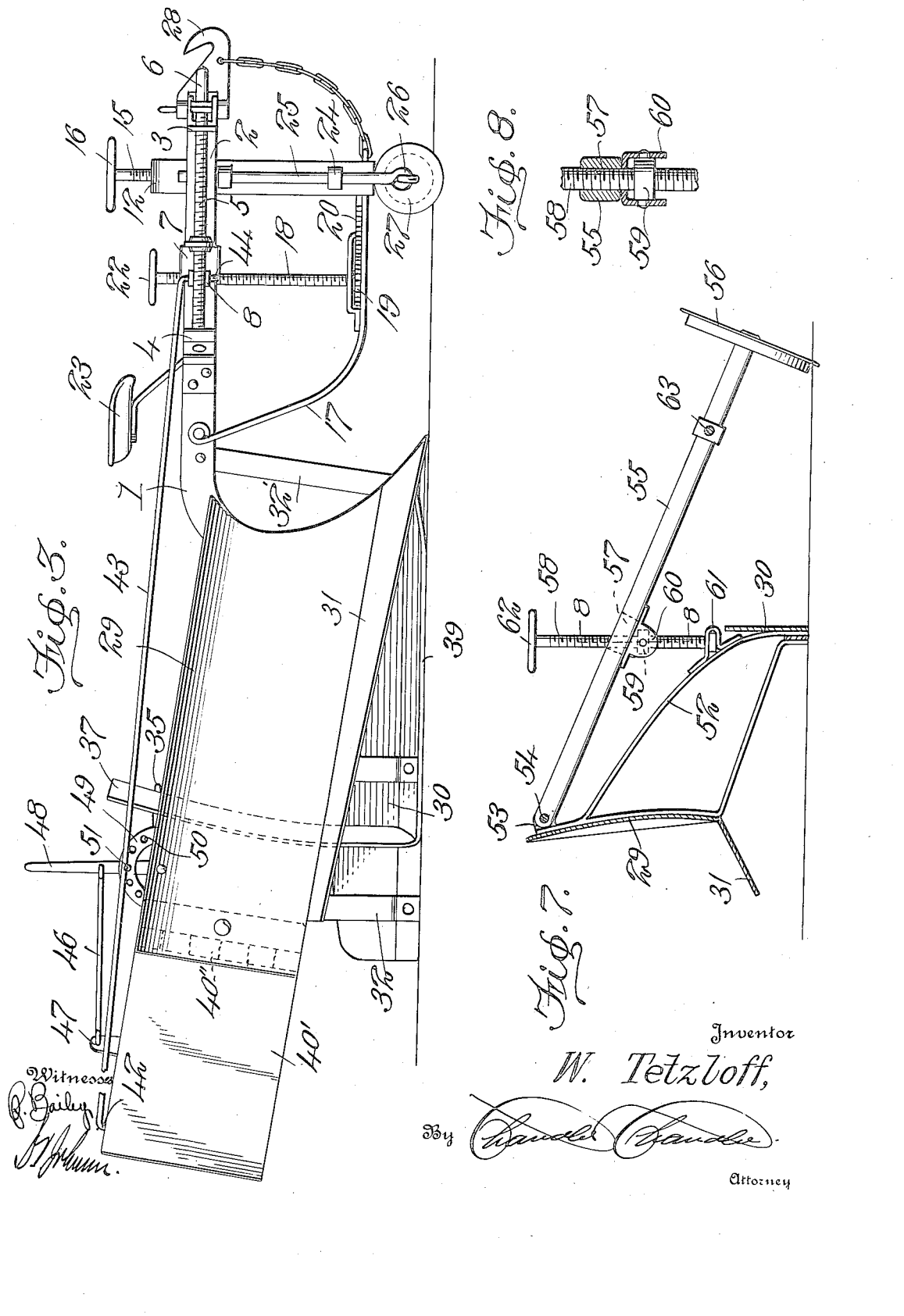

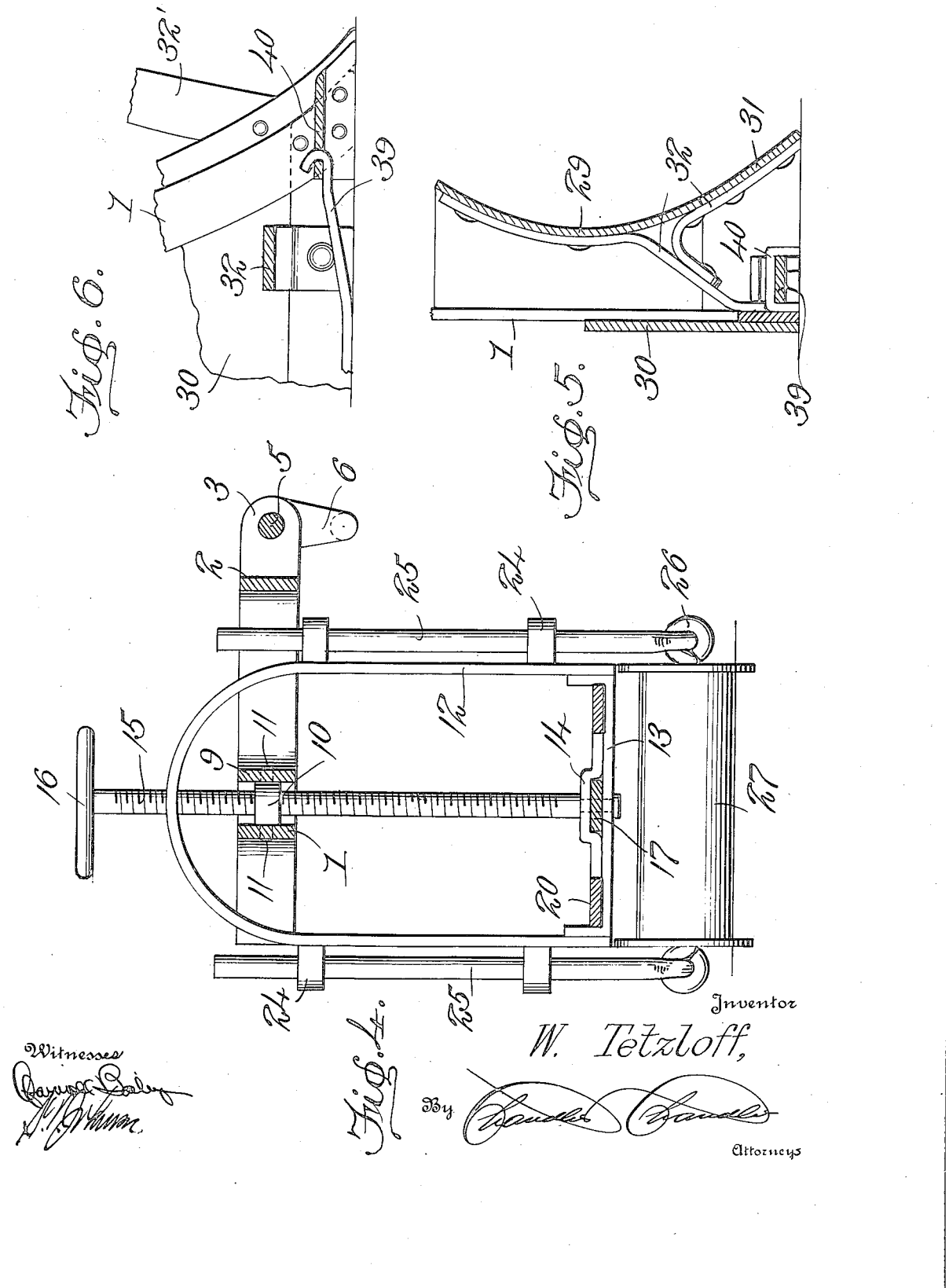

UNITED STATES PATENT OFFICE.

WILHELM TETZLOFF, OF NEW RICHLAND, MINNESOTA.

ROAD GRADING AND DITCHING PLOW.

1,213,434.

Specification of Letters Patent. Patented Jan. 23, 1917.

Application filed May 25, 1916. Serial No. 99,831.

*To all whom it may concern:*

Be it known that I, WILHELM TETZLOFF, a citizen of the United States, residing at New Richland, in the county of Waseca, State of Minnesota, have invented certain new and useful Improvements in Road Grading and Ditching Plows; and I do hereby declare the following to be a full, clear, and exact description of the invention, such as will enable others skilled in the art to which it appertains to make and use the same.

The present invention is directed to improvements in plows, and has for its object to provide a device of this character so constructed that it can be used for grading and ditching.

A further object of the invention is to provide a plow of this character having means whereby the beam can be raised or lowered so as to change the pitch of the plow point or share.

A still further object of the invention is to provide a scraper for leveling the earth adjacent the furrows, said scraper being capable of being vertically adjusted.

Still another object of the invention is to provide means to prevent lateral moving of the plow when in motion.

Another object of the invention is to provide a novel form of steering mechanism for the plow.

With these and other objects in view, this invention resides in the novel features of construction, formation, combination and arrangement of parts to be hereinafter more fully described, claimed and illustrated in the accompanying drawing, in which:—

Figure 1 is a side elevation of the plow. Fig. 2 is a top plan view. Fig. 3 is a side elevation opposite to Fig. 1. Fig. 4 is a sectional view on line 4—4 of Fig. 1. Fig. 5 is a sectional view on line 5—5 of Fig. 1. Fig. 6 is a sectional view on line 6—6 of Fig. 2. Fig. 7 is a sectional view on line 7—7 of Fig. 2. Fig. 8 is a sectional view on line 8—8 of Fig. 7. Fig. 9 is a sectional view on line 9—9 of Fig. 1. Fig. 10 is a sectional view on line 10—10 of Fig. 1. Fig. 11 is a sectional view on line 11—11 of Fig. 2.

Referring to the drawing 1 indicates the beam, said beam having carried thereby a lateral frame 2, said frame having carried thereby bearings 3 and 4, the latter having engaged therein the rear end of the screw shaft 5, the forward end of which rotatably engages the bearing 3. The shaft has engaged with one end a crank shaft 6 whereby the shaft can be rotated as desired. Slidable on the frame 2 is a bracket 7, said bracket being in threaded engagement with the shaft 5 and is further provided with an eye 8, the purpose of which will appear later.

The frame 2 is spaced as at 9 from the beam 1, and mounted within the space is a nut 10, said nut having projections 11 carried thereby for engaging respectively the beam and frame. The arch frame 12 is provided and has its arms connected at their lower ends with a bar 13, said bar having a bearing 14 carried thereby for receiving the lower end of the threaded shaft 15, said shaft being engaged in the nut 10 and has its upper end extended through the upper end of the frame 12, and is provided with a hand wheel 16. Thus it will be seen that upon operating the shaft 15 that the beam 1 can be raised or lowered as desired.

Having its upper end supported by the beam 1 and its lower end secured to the bar 13 is an arm 17 which has a bearing thereon for receiving the lower end of the shaft 18, said shaft being provided with a pinion 19 which meshes with the rack teeth of the segment 20, said segment having its ends secured to the frame 12. The upper end of the shaft 18 is engaged in a bearing 21 carried by the beam 1 and has its upper end provided with a hand wheel 22, said wheel being located in convenient reach of the occupant of the seat 23 which is supported by the beam 1. Since the rack segment 20 is fixed to the frame 12 it is obvious that the shaft 18 is operable to swing the frame 12 whereby the plow can be guided in the desired direction. The sides of the frame 12 are provided with bearings 24 and in which are engaged rods 25, the lower ends of which being connected to the ends of the axle 26 which is rotatably engaged by the drum wheel 27, said wheel being adapted to travel over the ground when the plow is propelled across the field.

A clevis 28 is adjustably connected with the forward end of the beam 1, and may be of any well known construction.

Secured to the rear end of the beam 1 is a moldboard 29 which has associated therewith the land side 30, which is also fixed to the beam 1. Associated with the moldboard 29 is the share 31, said land side and share being braced by the bars 32. Connected to the beam 1 and land side 30 is a blade 32' which serves to cut weeds or roots as the plow is in motion.

Mounted upon the inner surface of the moldboard 29 is a bracket 33, said bracket having threaded therein a shaft 34, the upper end of said shaft being provided with a hand wheel 35 whereby the shaft can be rotated. Also supported upon the inner surface of the moldboard is a guide 36 in which slides the bar 37, said bar being provided with a bearing 38 which rotatably receives the lower end of the shaft 34. Formed integral with the lower end of the bar 37 is a runner 39, the forward end of which is pivotally connected to the plate 40 which is mounted between the land side 30 and share 31. Thus it will be seen that upon rotation of the shaft 34 that the bar 37 can be raised or lowered thereby raising and lowering the runner 39 so as to regulate the plowing action of the plow.

The scraper 40' has its inner end hingedly connected as at 40'' to the end of the moldboard 29. The scraper is provided with a sleeve 41 which is engaged by the down turned end 42 of the rod 43, said rod having its forward end provided with a hook 44 which is adapted to engage the eye 8 of the bracket 7. It will be noted that the hinge plate 45 is pivotally connected to the moldboard 29 so that the scraper 41 can be swung backwardly and forwardly and also vertically so as to change the angular relation thereof with respect to said moldboard. The rod 43 which is adjustable longitudinally with the bracket 7 serves to swing the scraper 41 backwardly and forwardly, but when it is necessary to swing the scraper vertically a link 46 is provided and has its rear end connected to ears 47 carried by the scraper and its forward end connected to the hand lever 48 which is pivotally connected to the moldboard 29 and operates between the plates 49, said plates having openings 50 formed therein for detachably receiving the pin 51, which serves to hold the lever in different adjusted positions, thereby holding the scraper at the desired angle.

Connecting the moldboard 29 and the land side 30 is an arch bar 52, said bar having its upper end provided with spaced plates 53 which supports the pin 54, said pin being engaged in the inner end of the beam 55, said beam having its outer end provided with a disk 56 which is adapted to engage the earth so as to prevent lateral movement of the plow when in motion.

The beam 55 is provided with a slot 57 and in which is engaged the threaded shaft 58, said shaft being also engaged in the nut 59 which is pivotally supported between the plates 60, said plates being secured to the under surface of the beam 55. The arch bar is provided with the bearing 61 for rotatably receiving the lower end of the shaft 58, the upper end of which being provided with a hand wheel 62 whereby the shaft can be rotated to raise or lower the beam 55, as desired. Connecting the beams 1 and 55 is a link 63, said link serving to prevent the bearing 55 from swinging rearwardly.

From the foregoing description it will be seen that a plow has been provided and is constructed in such a manner that the same will be effective for digging ditches and grade roadways.

What is claimed is:—

1. A plow comprising a frame carried by the beam thereof, a supporting member extending beneath said beam, an arched frame mounted in said first named frame and connected to said supporting member, a segmental rack carried by said arched frame, operating means including a gear engaging said rack for actuating the same to turn said arched frame about its vertical axis, whereby to guide the plow, vertically arranged rods carried by said arched frame exteriorly of the sides thereof and having their lower ends extending below the lower end of said arched frame, and a ground engaging element supported by the lower ends of said rods.

2. A plow comprising a frame secured to the forward end of the beam thereof, bearings on said frame, a horizontally arranged adjusting member mounted in said bearings, a bracket arranged to slide on said frame and having operative connection with said adjusting member whereby the same may be adjusted, a scraper pivotally connected to the mold board of the plow, and a connection between the bracket and said scraper whereby to swing the latter about its pivots when the former is adjusted.

3. In a plow, the combination with the mold board and land side thereof, of an arched member connecting said parts, a laterally and downwardly extending beam pivoted to said mold board, a ground engaging disk carried by said beam, a bearing on said arched member, another bearing carried by said beam medially of its ends, and a screw shaft mounted in said bearings for vertically adjusting said beam.

In testimony whereof, I affix my signature, in the presence of two witnesses.

WILHELM TETZLOFF.

Witnesses:
W. A. POFAHL,
J. F. VAUGHAN.